(12) United States Patent
Drukman et al.

(10) Patent No.: US 8,930,895 B2
(45) Date of Patent: Jan. 6, 2015

(54) AUTOMATICALLY DISPLAYING A RELATED FILE IN AN EDITOR

(76) Inventors: Maxwell O. Drukman, San Francisco, CA (US); Andreas W. Wendker, Woodside, CA (US); D. Matthew Firlik, Cupertino, CA (US); Todd R. Fernandez, Mountain View, CA (US); Michael S. Ferris, Sunnyvale, CA (US); Anders I. Bertelrud, Burlingame, CA (US)

( * ) Notice: Subject to any disclaimer, the term of this patent is extended or adjusted under 35 U.S.C. 154(b) by 296 days.

(21) Appl. No.: 13/154,307

(22) Filed: Jun. 6, 2011

(65) Prior Publication Data

US 2011/0302556 A1 Dec. 8, 2011

Related U.S. Application Data

(60) Provisional application No. 61/352,225, filed on Jun. 7, 2010.

(51) Int. Cl.
*G06F 9/44* (2006.01)

(52) U.S. Cl.
CPC ........................................ *G06F 8/33* (2013.01)
USPC .......................................................... 717/113

(58) Field of Classification Search
CPC ............... G06F 8/33; G06F 8/34; G06F 8/71; G06F 9/4446
USPC .......................................................... 717/113
See application file for complete search history.

(56) References Cited

U.S. PATENT DOCUMENTS

| | | | |
|---|---|---|---|
| 5,956,513 A * | 9/1999 | McLain, Jr. ................... | 717/142 |
| 6,247,020 B1 * | 6/2001 | Minard ................. | 1/1 |
| 7,647,579 B2 * | 1/2010 | Drissi et al. ................... | 717/114 |
| 7,792,851 B2 * | 9/2010 | Berg et al. ..................... | 707/759 |
| 2003/0236576 A1 * | 12/2003 | Resnick et al. .................. | 700/9 |
| 2005/0235258 A1 * | 10/2005 | Wason .......................... | 717/110 |

OTHER PUBLICATIONS

Apple Inc., "Xcode 4 User Guide: Writing and Editing Source Code," Oct. 12, 2011, pp. 1-23, [online] [retrieved on Mar. 20, 2012] Retrieved from the internet <URL:http://developer.apple.com/library/mac/#documentation/ToolsLanguages/Conceptual/Xcode4UserGuid e/Editing/Editing.html#//apple_ref/doc/uid/TP40010215-CH8-SW2>.

(Continued)

*Primary Examiner* — Li B Zhen
*Assistant Examiner* — Hui-Wen Li
(74) *Attorney, Agent, or Firm* — Womble Carlyle Sandridge & Rice, LLP

(57) ABSTRACT

Art editor within an integrated development environment displays a related file automatically. When a user enters a command to open a first file in the editor, the editor not only displays the first file's content (in a "primary editor") but also automatically displays a second file's content (in a "related editor"), where the second file is related to the first file. In other words, when a first file is displayed in the editor, a file that is related to the first file is automatically displayed also. If the primary editor later displays a different file, then the file shown in the related editor will likely change as well, since the file shown in the related editor will be related to the "new" file in the primary editor. In other words, whatever is displayed in the related editor "tracks" whatever is displayed in the primary editor.

19 Claims, 6 Drawing Sheets

(56) References Cited

OTHER PUBLICATIONS

De Alwis, B., et al., "A comparative study of three program exploration tools," 15*th* IEEE International Conference on Program Comprehension (ICPC'07), Jun. 26-29, 2007, 12 Pages, can be retrieved at <URL:http://www.cs.ubc.ca/~bsd/papers/icpc-2007-dealwis.pdf>.

Desmond, M., et al., "Fluid Source Code Views for Just In-Time Comprehension", SPLAT 2006: Software Engineering Properties of Languages and Aspect Technologies, A workshop affiliated with AOSD 2006, Bonn, Germany, Mar. 21, 2006, pp. 1-4, can be retrieved at <URL:http://webhome.cs.uvic.ca/~chisel/pubs/desmond.pdf>.

Desmond, M., et al., "An evaluation of the inline source code exploration technique", Psychology of Programming Interest Group (PPIG), 21st Annual Workshop, Jun. 24-26, 2009, pp. 188-203, can be retrieved at <URL:http://www.ppig.org/papers/21st-desmond.pdf>.

Storey, M.-A., "Theories, Tools and Research Methods in Program Comprehension: Past, Present and Future", Software Quality Journal, Springer, 2006, pp. 187-208, vol. 14, No. 3, can be retrieved at <URL:http://webhome.cs.uvic.ca/~chisel/pubs/storey-pc-iwpc.pdf>.

Weigand Warr, F., et al., "Suade: Topology-Based Searches for Software Investigation," In Proceedings of the 29th International Conference on Software Engineering, May 20-26, 2007, pp. 780-783, can be retrieved at <URL:http://www.cs.mcgill.ca/~martin/papers/icse2007d.pdf>.

Robillard, M, "Automatic Generation of Suggestions for Program Investigation," In Proceedings of the Joint European Software Engineering Conference and ACM Sigsoft Symposium on the Foundations of Software Engineering, Sep. 5-9, 2005, pp. 11-20, can be retrieved at <URL:http://www.cs.mcgill.ca/~martin/papers/esecfse2005a.pdf>.

De Alwis, B., et al., "Answering Conceptual Queries with Ferret," In the Proceedings of the International Conference on Software Engineering (ICSE). Leipzig, Germany, Mary 10-18, 2008, pp. 21-30, can be retrieved at <URL:http://www.cs.ubc.ca/~bsd/papers/icse-2008-dealwis.pdf>.

\* cited by examiner

AUTOMATICALLY DISPLAYING A RELATED FILE IN AN EDITOR

CROSS-REFERENCE TO RELATED APPLICATION

This application claims the benefit of U.S. Provisional Application No. 61/352,225, filed Jun. 7, 2010, which is hereby incorporated by reference herein in its entirety.

BACKGROUND

1. Field of Art

This application generally relates to a software development environment. More particularly, it relates to automatically displaying a related file in an editor.

2. Description of the Related Art

Computer programmers frequently develop software applications using integrated development environments (IDEs). An IDE is a software application that usually includes an editor, a compiler and/or an interpreter, build automation tools, and a debugger. Examples of IDEs include the Xcode IDE from Apple Inc. of Cupertino, Calif., and the Visual Studio IDE from Microsoft Corp. of Redmond, Wash. Other IDEs are known to those of skill in the art.

The editor of an IDE includes features that facilitate viewing and editing text (e.g., source code or XML) and/or graphical content (e.g., representations of programming components such as data models or graphical user interface (GUI) components). The editor also includes features that facilitate moving between files and accessing related reference materials (e.g., an application programming interface (API) definition).

The editor can also include the ability to access and display related files. For example, an editor can provide a command that enables a user to quickly open a header file or a source file (the "related file") that is related to the file that is currently being displayed in the editor (the "primary file"). As another example, an editor can provide a command that enables a user to quickly open a (related) file that contains declarations of superclasses or subclasses of classes that are contained in the currently-displayed (primary) file. As yet another example, an editor can provide a command that enables a user to see an "include group" of the currently-displayed (primary) file. An include group consists of (related) files that are "included" in the currently-displayed file (e.g., files that are declared using a "#include" statement in the currently-displayed file) and files that "include" the currently-displayed file (e.g., by containing a "#include" statement that names the currently-displayed file).

The related file can be displayed in the existing editor window (thereby replacing the primary file) or in a new editor window (thereby being displayed simultaneously with the primary file). The display of the related file is caused by a user performing an action (e.g., activating a user interface element or issuing a command). The related file is of the same type as the currently-displayed (e.g., both files are text files that contain code).

SUMMARY

An editor within an integrated development environment (IDE) is enhanced so that the editor is able to display a related file automatically and/or display a related file that is of a different type as the currently-displayed file. The related file is intended to be useful to a user a software developer) who is working on the currently-displayed file. For example, assume that a user has entered a command to open a first file in an editor of an IDE. A conventional editor would display only the first file's content. An enhanced editor would not only display the first file's content but also automatically display a second file's content, where the second file is related to the first file. In other words, when a first file is displayed in the enhanced editor, a file that is related to the first file is automatically displayed also.

The graphical user interface (GUI) of the enhanced editor is "split" so that it includes both a primary editor and an additional editor (the "related editor"). The primary editor concerns one file (the "primary file"), and the related editor concerns a file related to the primary file (the "related file"). Note that since the related file is opened in an editor, it can be edited if desired.

The file that is displayed in the primary editor is determined by the user (e.g., the user commands the editor to open a particular file). The file displayed in the related editor is determined automatically. Specifically, the file displayed in the related editor is related to whatever file is shown in the primary editor. If the primary editor later displays a different file, then the file shown in the related editor will likely change as well, since the file shown in the related editor will be related to the "new" file in the primary editor. In other words, whatever is displayed in the related editor "tracks" whatever is displayed in the primary editor. In various embodiments, multiple related files may be displayed, for example by further splitting the content pane of the related editor into additional panes.

Automatic determination of which file to display in the related editor is based on "categories". A category is a grouping of content deemed in some way related to the primary file (e.g., based on a particular type of "relationship"). A relationship can concern various levels and scopings, looking at the primary file as a whole (and its relationship to other files), looking at the dominant structure or content within the primary file (class, data model, etc.), and even considering a selection or insertion point within the primary file. Each type of file is associated with one or more relationship types.

A GUI control associated with the related editor displays the submode (relationship type) of the related file and other information and can be used to change the submode (and, therefore, the file that is displayed). If the first segment of the GUI control is clicked, a popup menu appears that lists all possible submodes (relationship types) that are associated with the primary file. The user can select one of these submodes. If the second segment of the GUI control is clicked, a popup menu appears that lists names of files that are related to the primary file based on the selected submode/relationship. The user can select one of these files. The selected file will then be displayed in the related editor.

DETAILED DESCRIPTION

The features and advantages described in the specification are not all inclusive and, in particular, many additional features and advantages will be apparent to one of ordinary skill in the art in view of the drawings, specification, and claims. The language used in the specification has been principally selected for readability and instructional purposes, and may not have been selected to delineate or circumscribe the disclosed subject matter.

The figures and the following description relate to embodiments of the invention by way of illustration only. Alternative embodiments of the structures and methods disclosed here may be employed without departing from the principles of what is claimed.

Reference will now be made in detail to several embodiments, examples of which are illustrated in the accompanying figures. Wherever practicable similar or like reference numbers may be used in the figures and may indicate similar or like functionality. The figures depict embodiments of the disclosed systems (or methods) for purposes of illustration only. One skilled in the art will readily recognize from the following description that alternative embodiments of the structures and methods illustrated herein may be employed without departing from the principles described herein.

As described above, a conventional editor of an integrated development environment (IDE) can include the ability to access and display related files. The display of the related file is caused by a user performing an action (e.g., activating a user interface element or issuing a command). The related file is of the same type as the currently-displayed file (e.g., both files are text files that contain code).

In one embodiment, an IDE editor is enhanced so that the editor is able to display a related file automatically and/or display a related file that is of a different type as the currently-displayed file. The related file is intended to be useful to a user (e.g., a software developer) who is working on the currently-displayed file. For example, assume that a user has entered a command to open a first file in an editor of an IDE. A conventional editor would display only the first file's content. An enhanced editor would not only display the first file's content but also automatically display a second file's content, where the second file is related to the first file. In other words, when a first file ("primary file") is displayed in the enhanced editor, a file that is related to the primary file ("related file") is automatically displayed also.

Figure 1:
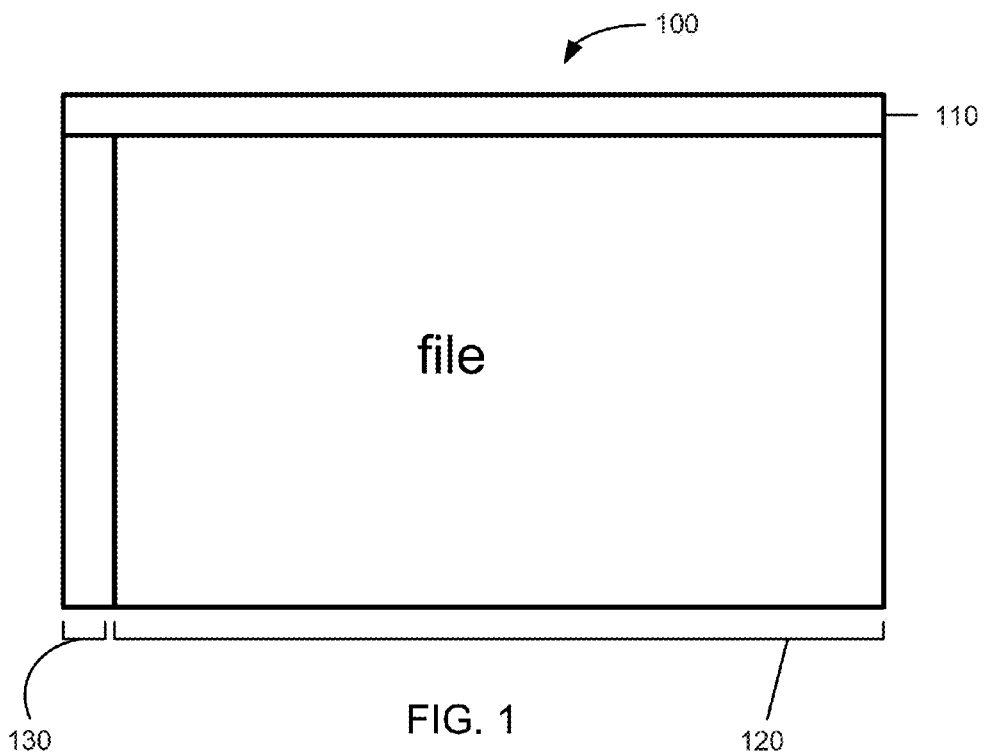
FIG. 1 illustrates a graphical user interface (GUI) for an enhanced editor that is displaying only one file, according to one embodiment of the invention.

In one embodiment, this feature of automatically displaying a related file (referred to as "Assistant") can be turned on or off by the user. When the Assistant feature is turned off, a content pane of the enhanced editor displays only one file, referred to as the "primary file". FIG. 1 illustrates a graphical user interface (GUI) for an enhanced editor that is displaying only one file, according to one embodiment of the invention. The illustrated GUI 100 includes a menu bar 110, a content pane 120, and a gutter 130. The menu bar 110 includes one or more user interface (UI) controls (e.g., menus and/or buttons) that can be used to move between previously-viewed files, open related files, and access current "issues". The content pane 120 displays the contents of the primary file. The gutter 130 displays file line numbers and information about the location of breakpoints, errors, or warnings in the primary file. Since the menu bar 110, the content pane 120, and the gutter 130 all concern the primary file, they are collectively referred to as the "primary editor".

Figure 2:
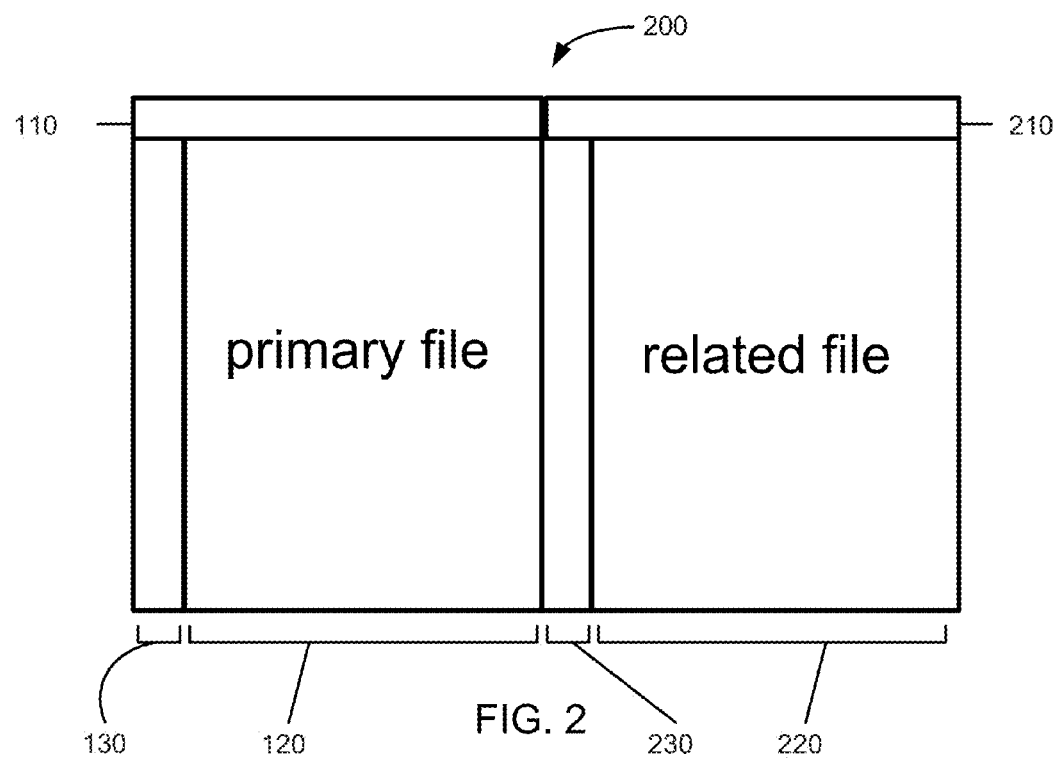
FIG. 2 illustrates a GUI for an enhanced editor that is displaying a primary editor and a related editor, side by side, according to one embodiment of the invention.

When the Assistant feature is turned on, the GUI of the enhanced editor (e.g., GUI 100 of FIG. 1) is "split" so that it includes both the primary editor and an additional editor (the "related editor" or "Assistant editor"). The primary editor concerns one file (the "primary file"), and the related editor concerns a file related to the primary file (the "related file"). FIG. 2 illustrates a GUI for an enhanced editor that is displaying a primary editor and a related editor, side by side, according to one embodiment of the invention. The illustrated. GUI 200 includes two menu bars 110 and 210, two content panes 120 and 220, and two gutters 130 and 230. The menu bar 110, the content pane 120, and the gutter 130 are part of the primary editor, which concerns the primary file. These elements were described above with reference to FIG. 1. The menu bar 210, the content pane 220, and the gutter 230 are part of the related editor, which concerns the related file. The menu bar 210, the content pane 220, and the gutter 230 are similar to the menu bar 110, the content pane 120, and the gutter 130, except that the former set of elements concerns the related file, while the latter set of elements concerns the primary file.

Content pane 120 displays the primary file, and content pane 220 displays the related file. Note that since the related file is opened in an editor, it can be edited if desired. Menu bar 110 is located above content pane 120 (which displays the primary file), and menu bar 210 is located above content pane 220 (which displays the related file). Gutter 130 is located to the left of content pane 120 (which displays the primary file), and gutter 230 is located to the left of content pane 220 (which displays the related file).

The file that is displayed in content pane 120 is determined by the user (e.g., the user commands editor to open a particular file). The file displayed in content pane 220 is determined automatically. Specifically, the file displayed in content pane 220 is related to whatever file is shown in content pane 120. If content pane 120 later displays a different file, then the file shown in content pane 220 will likely change as well, since the file shown in content pane 220 will be related to the "new" file in content pane 120. In other words, whatever is displayed in content pane 220 "tracks" whatever is displayed in content pane 120 (sometimes referred to as "tracking mode" or "automatic mode"). Automatic determination of which file to display in content pane 220 is discussed below. Note that in various embodiments, multiple related files may be displayed, fix example by further splitting content pane 220 into additional panes. We presume only one pane in content pane 220 for purposes of discussion here, but that presumption should not be considered a limitation on the described invention.

Figure 3:
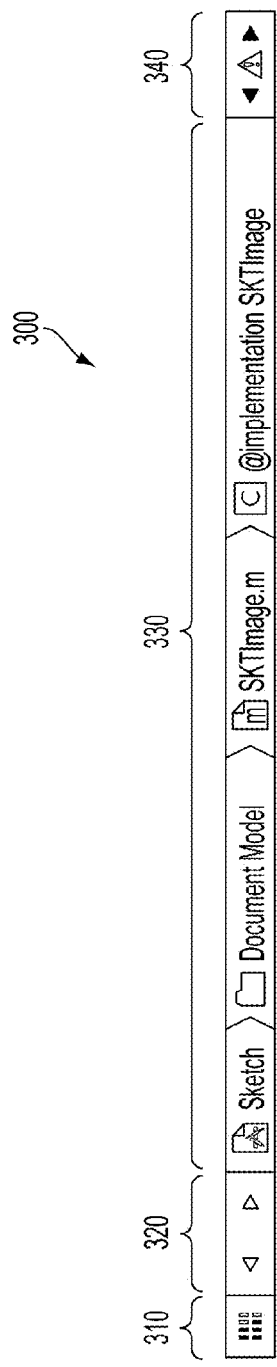
FIG. 3 illustrates a menu bar for a first content pane (displaying a primary file) of an enhanced editor, according to one embodiment of the invention.

FIG. 3 illustrates a menu bar for a first content pane (displaying a primary file) of an enhanced editor, according to one embodiment of the invention. The illustrated menu bar 300 (sometimes referred to as a "jump bar") corresponds to the menu bar 110 shown in FIG. 2. The menu bar 300 includes a navigation popup menu 310, a history control 320, a path control 330, and an issue cycler control 340.

The navigation popup menu 310 lists "categories" of related files (i.e., files that are related to the primary file) and the contents of the categories (e.g., particular file names of related files). A category (or "Assistant category") is a grouping of content deemed in some way related to the primary file (e.g., based on a particular type of "relationship"). A relationship can concern various levels and scopings, e.g., looking at the primary file as a whole (and its relationship to other files), looking at the dominant structure or content within the primary file (class, data model, etc.), and even considering a selection or insertion point within the primary file.

In one embodiment, each type of file is associated with one or more relationship types, as shown in Table 1. In Table 1, if a type of file is associated with several relationship types, then similar relationship types are grouped together for explanatory purposes.

TABLE 1

| Type of File | Group-relationship type(s) |
| --- | --- |
| Source code | Source-counterparts, includes, included by |
| | Classes-superclasses, subclasses, siblings, categories, construction, variables, return types |
| | Protocols-conformers, incorporators, incorporatees, includes, included by |
| | Categories-parent, includes, included by |
| | Methods/functions-overridden, overrides, callers, callees |
| Data model | Models and mappings-implementers, model versions, mapping models |
| | Entities-managed objects, implementers, presenters |
| | Properties-property class, transformers |
| | Relationships-inverses |
| | Fetch requests-managed objects, implementers |
| | Configurations-managed objects, implementers |
| Data mapping model | Models-data models |
| | Mappings-policies |
| Interface | Document-application, files owner, controllers, views, top-level objects, custom classes, instantiators |
| | Selection-custom classes, owning outlets, connected outlets, connected actions, connected bindings |
| Project | Target build phase-members |
| | Target build rule-files |
| | related projects |
| Strings | referrers |
| Resource | referrers, presenters |
| Activity log | Build-issues, members |
| | SCM-updated, committed, members |

The navigation popup menu 310 can be used to change the that is displayed in content pane 120. When the navigation button is clicked, the navigation popup menu 310 appears and lists categories (relationship types) associated with the file type of the primary file. The user can then select one of the categories as desired. After a category has been selected, the navigation popup menu 310 lists names of files that are related to the primary file based on the selected category. The user can then select one of the file names as desired. The file that is currently displayed in content pane 120 will be replaced with the selected file.

For example, assume that the type of the primary file is "Source code". If the navigation button is clicked, the navigation popup menu 310 will appear and list the appropriate categories (relationship types; see Table 1). If the "counterparts" category is selected, then names of files will be displayed that are related to the primary file based on the counterparts relationship. If one of these files is selected, then the selected file will be displayed in the content pane 120 (thereby replacing the file that had previously been displayed in the content pane 120). Relationship types are further discussed below.

The history control 320 enables a user to navigate to files that were previously displayed by the primary editor, according to a chronologically-ordered list of files that is automatically maintained. The history control 320 is divided into two sections: the back button and the forward button. Clicking the back button causes the immediately-previous file (based on the ordered list) to be displayed in the content pane 120 (thereby replacing the file that had previously been displayed in the content pane 120). Clicking the forward button causes the immediately-subsequent file (based on the ordered list) to be displayed in the content pane 120 (thereby replacing the file that had previously been displayed in the content pane 120). Pressing down on the back button and holding causes a popup menu of file names of previous files (based on the ordered list) to appear. Pressing down on the forward button and holding causes a popup menu of file names of subsequent files (based on the ordered list) to appear. Selecting a file name from these popup menus causes the selected file to be displayed in the content pane 120 (thereby replacing the file that had previously been displayed in the content pane 120).

The path control 330 displays the structured path in the workspace to the primary file. The first segment is the parent item, which is either a project (e.g., an Xcode project) or nothing (for files directly in the workspace). The subsequent segments present the group structure up to the primary file. The last segment presents document structure navigation (e.g., names of methods that are declared in the document). Pressing down on a segment and holding causes a popup menu of contained children to appear and enables a child to be selected.

The issue cycler control 340 provides access to the current "issues" for the workspace (e.g., errors, warnings, and static-analyzer messages). The control is divided into three sections: the two cycler buttons and the indicator. The indicator displays an icon for the highest issue type present in the workspace (error, war g, etc.). Clicking on the indicator presents a popup menu of the issues in the current file and the other files with issues. Selecting any item in the popup menu navigates the primary editor to the issue. The cycler buttons (back and forward) cycle through the items, selecting each, causing navigation.

Figure 4:
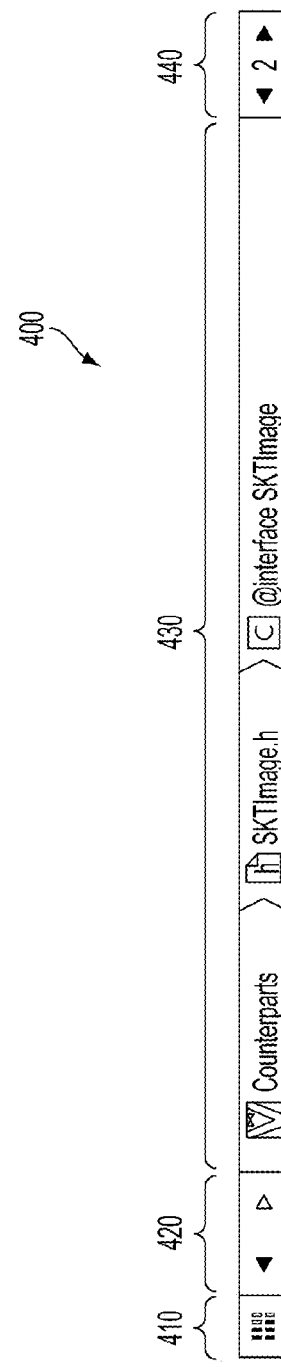
FIG. 4 illustrates a menu bar for a second content pane (displaying a related file) of an enhanced editor, according to one embodiment of the invention.

FIG. 4 illustrates a menu bar for a second content pane (displaying a related file) of an enhanced editor, according to one embodiment of the invention. The illustrated menu bar 400 (sometimes referred to as a "jump bar") corresponds to the menu bar 210 shown in FIG. 2. The menu bar 400 includes a navigation popup menu 410, a history control 420, a path control 430, and a related-item cycler control 440.

The navigation popup menu 410 and the history control 420 in FIG. 4 are similar to the navigation popup menu 310 and the history control 320 in FIG. 3, respectively.

The path control 430 displays the submode (relationship type or "tracking criterion") of the related file and other information. This "relationship type" is the same relationship type that was described above with reference to categories and the navigation popup menu 310. In the context of the navigation popup menu 310, a relationship type is referred to as a category. In the context of the path control 430, a relationship type is referred to as a submode.

The first segment of the path control 430 shows the submode (relationship type) of the content pane 220 (here, "All Counterparts"; other possible content modes are discussed below). The remaining segments of the path control 430 show the name of the related file (here, a header file named "SKTImage.h") and a particular portion of the related file (here, an interface named "SKTImage").

Not only does the path control 430 display the submode and other information, but it can also be used to change the submode and the file that is displayed. When a segment of the path control is clicked, a popup menu appears that lists all possible values for that segment. The user can select one of these values as desired. For example, if the first segment of the path control is clicked, a popup menu (sometimes referred to as the "Assistant popup menu") appears that lists all possible submodes (relationship types) that are associated with the primary file. The user can select one of these sub modes. Assume that the current submode is "All Counterparts". If the second segment of the path control is clicked, a popup menu appears that lists names of files that are related to the primary file based on the counterparts relationship. The user can select one of these files. If the last segment of the path control is clicked, a popup menu appears that lists various navigation points within the related file (e.g., names of functions that are declared within the file).

In one embodiment, a "Manual" content mode is available for the Assistant feature. In this mode, the contents of the secondary editor (content pane 220) are selected and managed manually by the user (in the same way that content is selected and managed for the primary editor—content pane 120). In manual mode, the related-item cycler control 440 (discussed below) is replaced by an issue cycler control similar to issue cycler control 340 in FIG. 3.

The related-item cycler control 440 enables a user to move amongst items (e.g., files) within the same (currently-active) submode and is displayed only if there is more than one item in the current submode. When the related-item cycler control is displayed, it is divided into three sections: the two cycler buttons and the count. The count displays the total number of items related items) in the selected submode. The cycler buttons (back and forward) cycle through the items, selecting each. Selecting an item causes navigation in the related editor (i.e., causes content pane 220 to display a different file or a different portion of the previously-displayed file). So, in order to display a different file within the same submode, a user can use either the related-item cycler control 440 (specifically, the cycler buttons) or the path control 430 (specifically, the middle segment), as explained above.

The determination of which related file to display is based on a) the file that is currently being displayed in the editor (the "primary file") and b) a currently-active submode. The contents of the related editor (content pane 220) are correlated with the contents and/or selection therein of the primary editor (content pane 120). Most of the submodes are "tracking" in that the related file "tracks" the primary file. In other words, for most of the submodes, the determination of the related file is based on the file being displayed in the primary editor (and possibly also a selection or location of the insertion point within that file). For example, the files listed in the superclasses submode are all of the classes that make up the parent hierarchy for the file/class selected in the primary editor.

Referring to Table 1, the source code groups and relationship types are explained first, followed by a user scenario and technical details. After that, the other groups and relationship types are explained.

Source code—These relationship types are generated as a result of analyzing the symbolic information about source code files. In one embodiment, the enhanced editor has access to a symbolic index that maintains detailed information about code in a project and code in libraries used by a project. This index is created, for example, the first time that a project is opened in an IDE. Thereafter, the index is updated in the background as changes are made to the project.

The source code relationship types can vary by the type of symbolic item within the file. Some of these relationship types are based on the existence of content in the primary file, while others are generated based on the current selection or insertion point in the primary file.

In the source group, relationship types are derived by and associated with source files, as follows: Counterparts—all similarly named source files. In one embodiment, the pattern matching used to identify whether a source file is a counterpart is: a) whether the source file has the same file name as the primary file but a different file extension and b) whether the source file has the primary file name as a prefix, with the same or different file extension. Includes all header files included by the primary file. Included by—all header files that include the primary file.

In the classes group, relationship types are derived by and associated with object classes (e.g., Objective-C, Objective-C++, and C++ classes), as follows: Superclasses—all classes making up the superclass hierarchy of a particular class (e.g., the class name that is selected or marked with an insertion point in the primary file). Subclasses—all subclasses of a particular class (selected or insertion point). Siblings all peer classes (classes with the same superclass) of a particular class (selected or insertion point). Categories—all categories implemented on a particular class (selected or insertion point). Construction—all symbolic items constructing the runtime functionality (e.g., class declaration, definition, class extensions, categories, and protocols) of a particular class (selected or insertion point). Variables the classes for all instance variables (and class variables, where applicable) of a particular class (selected or insertion point). Return types—all classes used as return types for APIs declared by a particular class (selected or insertion point).

In the protocols group, relationship types are derived by and associated with Protocols, as follows: Conformers—all classes conforming to a particular protocol (selected or insertion point). Incorporators—all protocols that are incorporated by a particular protocol (selected or insertion point). Incorporates—all protocols that incorporate a particular protocol (selected or insertion point). Includes—header files included by the primary file. Included by—header files that include the primary file.

In the categories group, relationship types are derived by and associated with Categories, as follows: Parent the class on which a particular category (selected or insertion point) is applied. Includes—header files included by the primary file. Included by—header files that include the primary In the methods/functions group, relationship types are derived by and associated with a method or function scope in the primary file. The contents of these relationship types may be correlated to or driven by the current selection or insertion point, as follows: Overridden—all symbolic locations overridden by the current method/function implementation. Overrides—all symbolic locations that override the current method/function implementation. Callers—all symbolic locations that directly call the current method/function. Callees—all symbolic locations directly called by the current method/function.

The following user scenario demonstrates how an enhanced editor might be used. Technical details will be discussed after the user scenario.

A software developer commands the enhanced editor to open a source code file named "main.c." The enhanced editor displays both "main.c" (in content pane 120) and a file named "main.h" (in content pane 220), which is related to main.c based on the "counterparts" relationship type.

The user commands the enhanced editor to open a source code file named "myfile.c" in content pane 120. The enhanced editor displays both "myfile,c" (in content pane 120) and a file named "myfite.h" (in content pane 220), which is related to myfile.c based on the "counterparts" relationship type.

The user clicks on the first segment in the path control 430 in menu bar 210. A popup menu appears that lists submodes for the primary file. Since the primary file (myfile.c) is source code file, the submodes are "counterparts", "includes", "included by", etc. The user selects the "includes" submode. The enhanced editor replaces "myfile.h" (in content pane 220) with "yourfile.h", which is related to myfile.c based on the "includes" relationship type (specifically, myfile.c has a #include statement for yourfile.h).

The user clicks on the middle segment in the path control 430 in menu bar 210. A popup menu appears that lists included files for the primary file (e.g., yourfite.hand ourfile.h). The user selects "ourfile.h". The enhanced editor replaces "yourfile.h." (in content pane 220) with "ourfile.h.", which is related to myfile.c based on the "includes" relationship type (specifically, mytile.c has a #include statement for ourfile.h).

Figure 5:
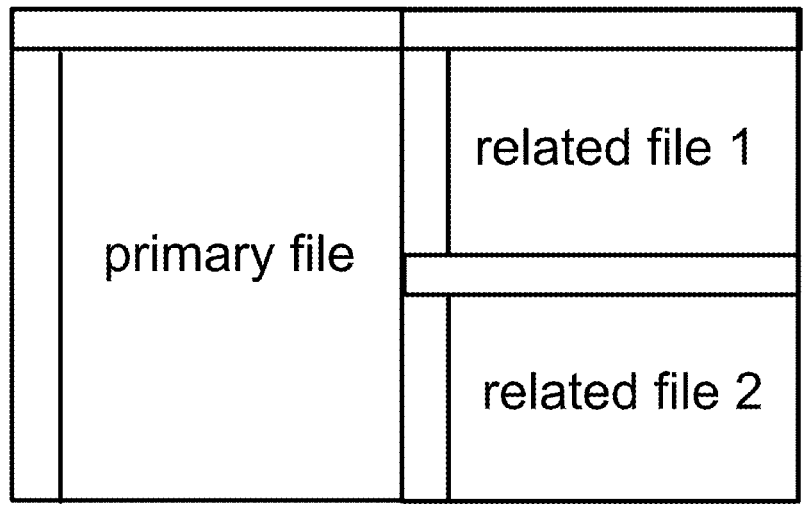
FIG. 5 illustrates a GUI for an enhanced editor that is displaying a primary editor next to a related editor (where the related editor is showing multiple related files), according to one embodiment of the invention.

As mentioned above, there can be more than one file that is "related" to the primary file based on the current submode. In one embodiment, content pane 220 displays multiple related files instead of only one related file. FIG. 5 illustrates a GUI for an enhanced editor that is displaying a primary editor next to a related editor (where the related editor is showing multiple related files), according to one embodiment of the invention. If additional related files exist beyond those being displayed, then the additional files can be navigated to using the related-item cycler control 440 or the path control 430, as explained above.

In one embodiment, the number of related files shown in the related editor depends on the type of files that are being shown. For example, if one of the related files is an implementation file (e.g., a source code file named "myfile.c"), then the related editor will also show the corresponding header file (e.g., myfile.h) for a total of two files in the related editor. If the related file is a standalone file, then only that standalone file will be shown in the related editor for a total of one file in the related editor. Again, if additional related files exist beyond those being displayed, then the additional files can be navigated to using the related-item cycler control 440 or the path control 430, as explained above.

Figure 6:
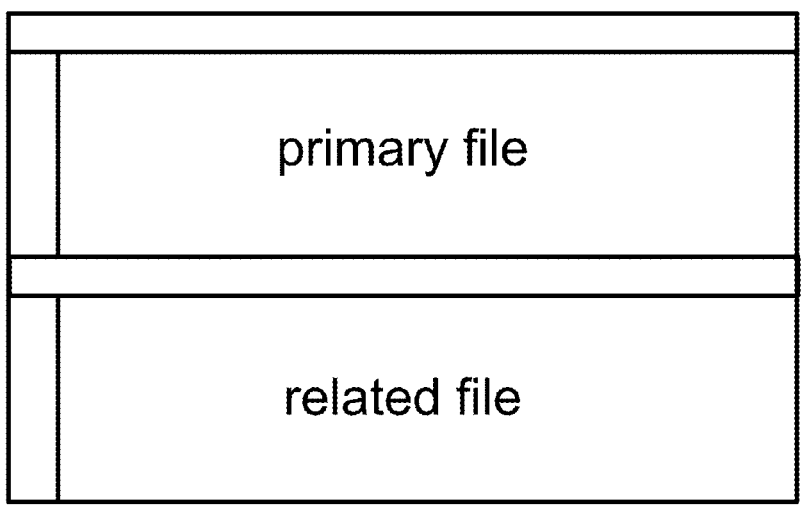
FIG. 6 illustrates a GUI for an enhanced editor that is displaying a primary editor and a related editor, one on top of the other, according to one embodiment of the invention.
Figure 7:
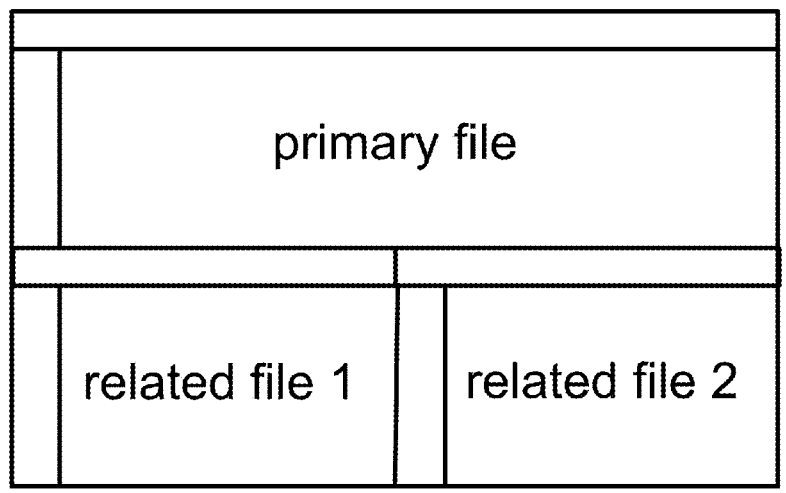
FIG. 7 illustrates a GUI for an enhanced editor that is displaying a primary editor on top of a related editor (where the related editor is showing multiple related files), according to another embodiment of the invention.

So far, the GUI for the enhanced editor has shown a primary editor and a related editor being oriented side by side and separated with a vertical line. However, the primary editor and the related editor can also be placed on top of each other and separated with a horizontal line. FIG. 6 illustrates a GUI for an enhanced editor that is displaying a primary editor and a related editor, one on top of the other, according to one embodiment of the invention. FIG. 7 illustrates a GUI for an enhanced editor that is displaying a primary editor on top of a related editor (where the related editor is showing multiple related files), according to another embodiment of the invention.

In one embodiment, the default orientation for the primary editor and the related editor (side by side or on top) is whichever orientation will result in the largest presentation of content. For example, textual content is presented side-by-side, to display the greatest range of content. (More tines of text can be shown (wrapped or unwrapped) in a vertically tall editor than a horizontally wide editor.) Graphical content is presented in whichever orientation will display the greatest amount of content. For example, a GUI file for a desktop application (e.g., a .nib file for a Mac OS X application) may prefer a horizontal split in order to present a greater amount of a window, while a GUI file for a smartphone application (e.g., a.nib file for an iPhone application) may prefer a vertical split order to align with the dimensions of the interface (tall rather than wide). A user can change the split (vertical line versus horizontal line) if desired.

There are two selections that combine to define the content presented in content pane 220: the submode (relationship type) and the indicated item (if any) within the submode, where an item (e.g., a class name) is indicated by a selection or placement of an insertion point. When a source code file is displayed in content pane 120, by default the Counterparts submode is selected.

If the primary document indicates an item and the submode tracks with the indication, then the corresponding content from the submode for the selection is shown. For example, if the primary file is main.c, the submode is Siblings, and the class "MyObject" is indicated, then the related file mycode.c will be displayed (where mycode.c defines the YourObject class, which is a peer of the MyObject class). If the primary document does not indicate a selected item or if the submode does not track with the selection, then the first item in the submode is selected (e.g., the first included file with the Includes submode).

In one embodiment, the order of items in the Counterparts submode is determined by relative importance and formality, preferring primary declarations and definitions over extended ones. For example, for source files, the precedence of items in the Counterparts submode is:

| | |
|---|---|
| MyClass.m | primary declaration |
| MyClass.h | primary definition |
| MyClass_Private.h | extended declaration |
| MyClass_Internal.h | extended declaration |
| MyClass_other.h | extended declaration |
| MyClass_other.m | extended definition |

Data model—A data model file a Core Data model file) defines structured relationships that are used at runtime by a data framework (e.g., the Core Data framework) to manage object graphs. The submodes for a data model file are at two levels: for the file itself (as related to other files) and for the content defined in the model. These submodes will generally present the entirety of the available content, but will also synchronize with a selection in the editor to display the content specifically correlated to the selection. In one embodiment, when a data model file is displayed in content pane 120, by default the Managed Objects submode is selected. The related files are determined by introspecting the selected entity in the data model and looking at the "class" property (which is a string that defines the class to use at runtime). If there is a value set, it is looked up in the symbol index to find the files that provide those symbols.

In the models and mappings group, submodes are derived by other related Core Data documents, as follows: implementers—all symbolic locations loading the primary model file by name. Model versions all other versions of the primary model file. Mapping models—all mapping models that use the primary model file as either the source or destination.

In the entities group, submodes are derived by and associated with Core Data NSEntityDescriptions, as follows: Managed objects—all runtime classes for managed objects in the primary model (or driven by user selection). This submode presents the list of classes associated with the selected entity. The items in the list are all of the items that make up the class. The order of items is to show the declaration (header) first, then any of the implementation files. Implementers—all symbolic locations creating a managed object of this entity type. Presenters—all interface files (e.g., Interface Builder files) with user interface elements configured to present data for an entity of this type.

In the properties group, submodes are derived by and associated with Core Data NSAttributeDescriptions or NSPropertyDescriptions, as follows: Property class—all classes representing the runtime classes for the selected property. Transformers—all NSValueTransformers utilized by the selected property at runtime.

In the relationships group, submodes are derived by and associated with Core Data NSAttributeDescriptions or NSPropertyDescriptions, as follows: Inverses—all classes representing the runtime classes for managed objects for the selected relationship.

In the fetch requests group, submodes are derived by and associated with Core Data NSTetchRequests, as follows: Managed objects all classes representing the runtime classes for managed objects returned by the selected fetch request. Implementers—all symbolic locations using the selected fetch request by name.

In the configurations group, submodes are derived by and associated with Core Data entity configurations, as follows: Managed objects all classes representing the runtime classes for managed objects in this configuration. Implementers—all symbolic locations accessing the configuration from the runtime model by name.

Data mapping model—These submodes are generated as a result of analyzing the information in a data mapping model (e.g., a Core Data mapping model). A mapping model define the rules through which data structured via one data model version (e.g., Core Data model version) can be transformed and migrated into another version. The submodes for mapping models are at two levels: for the file itself (as related to other files) and for the content defined in the model. In one embodiment, when a data mapping model file is displayed in content pane 120, by default the Data Models submode is selected.

In the models group, submodes are derived by other related Core Data documents, as follows: Data models—the two (development-time) data models utilized by selected mapping model at runtime. The data models submode presents the list of data models used by the mapping model. The list is created as follows: the mapping, model has two properties (the source and destination model) as part of its definition, so those references are obtained. The source model is listed first because ifs logically used before the destination model.

In the mappings group, submodes are derived by and associated with the mapping rule contents, as follows: Policies—all custom policy classes used by the selected entity mapping.

Interface—These submodes are generated as a result of analyzing the information in an interface document (e.g., an interface Builder document). Interface Builder documents represent archives of views and controllers that are instantiated at runtime to present user interfaces. In one embodiment, when an interface file is displayed in content pane 120, by default the Top-Level Objects submode is selected.

In the document group, submodes are derived by the top-level content of the Interface Builder document, as follows: Application the symbolic locations for the class for the Application instance for the document. Files owner—the symbolic locations for the class for the Files Owner instance for the document. Controllers—the symbolic locations for all of the controller classes of the document. Views—the symbolic locations for all view classes of the document. Top-level objects—the symbolic locations for the top-level objects in the document. The top-level objects submode presents the runtime classes for the objects at the top level of the NIB document. In one embodiment, the precedence of items is the order in which the Objects are listed in the document, with Files Owner first, then First Responder, then Application, and then the user's content. In another embodiment, a heuristic is used to determine the top-level object that is "most used" and then make that object the first item shown. The usage level of an object is measured by the number of connections that that object has at runtime (e.g., a connection to a first object that sets a property on the target object or a connection to a second object where the target object commands the second object to perform an action). Custom classes—the symbolic locations for all custom classes used in the document. Instantiators symbolic locations loading this NIB file resource by name, including other NIB files.

In the selection group, submodes are derived from the current selection within the Interface Builder document, as follows: Custom classes—the symbolic locations for the custom class(es) used by the selection. Owning outlets—the symbolic locations of source outlets for the selection. Connected outlets the symbolic locations of destination outlets for the selection. Connected actions the symbolic locations of actions connected to/by the selection. Connected bindings—the symbolic locations of bindings destinations connected to/by the selection.

Project—These submodes are generated as a result of analyzing the information in a project file Xcode project file). In one embodiment, when a project file is displayed in content pane 120, by default the Related Projects submode is selected.

In the target build phase group, submodes are derived by and associated with build phases (e.g., Xcode build phases), as follows: Members—all files participating in some aspect of the selected build phase.

In the target build rule group, submodes are derived by and associated with build rules (e.g., Xcode build rules), as follows: Files—all files affected by the selected build rule (or to which the build rule applies).

Related projects—projects referenced by this project. Projects can have references to other projects, (Targets in the project have lots of related files, but not the project itself) Related projects would be determined by looking for any project references in the current project and listing them in the order in which they occur.

Strings—This submode is generated as a result of analyzing references to a localization string file (e.g., a .strings file). Referrers—all symbolic locations invoking APIs that reference this string file. This would apply at the file level and the selection within the string file.

Resource—These submodes are generated as a result of analyzing references to other resource files in a project e.g., Xcode project). Resources are items like images, movies, property lists, etc (e.g., assets included in, loaded by, or accessed by an application, framework, or library at runtime). In one embodiment, when a resource file is displayed in content pane 120, by default the Referrers submode is selected. Referrers—all symbolic locations invoking APIs that reference this resource. The referrers submode lists all of the files that use the resource in some way. In one embodiment, the files are sorted alphabetically by name. In another embodiment, the files are sorted by frequency of usage (e.g., most usages of a resource in a single file at the top, etc.). Presenters—all Interface Builder files (and objects) that reference this resource.

Activity log—These submodes are generated as a result of analyzing the contents of an activity/output log from an IDE (e.g., Xcode). The activity/output logs are the historical transcripts from various actions within the IDE.

In the build group, submodes are derived by and associated with logs for Build-related actions, as follows: Issues—all file locations generating issues found in the build log. Inherently, all IDE logs contain references to files (file locations), so the content of this submode is gathered by pulling the particular list of files from the log itself. In this case, the content would be all files which (at the time of the build) had an issue. In one embodiment, the ordering of the content is based on the chronological positioning of the content in the tog, with the earliest content being first. In another embodiment, the files are ordered based on number of issues, with the files with more issues given precedence over files with fewer issues. In yet another embodiment, the files are ordered based on severity, with the most severe issues listed first and the lesser issues afterwards. This could be applied on top of the previous heuristic, so items are weighted by severity of issues multiplied by the number of issues in the document. Members—all files participating in some phase or aspect of the build log. In one embodiment, when a build log file is displayed in content pane 120, by default the issues submode is selected.

In the SCM (software configuration management) group, submodes are derived by and associated with logs for SCM-related actions, as follows: Updated all files updated as part of the activity represented in the SCM log. Committed—all files committed as part of the activity represented in the SCM log. Members—all files participating in some aspect of the SCM log. Similar to the build group, the SCM group members content is gathered by pulling from the list of files operated on/in the log. In this case, the content would be all files with any SCM status at all (deleted, updated, added, removed, etc.). In one embodiment, the ordering is by chronology, with the first item in the submode being the earliest item in the list. In another embodiment, the files are ordered based on relative importance of the operation taken, with the most severe or important status items listed first (e.g., conflicts, commits, merges, updates, and ignores). In one embodiment, when an SCM log file is displayed in content pane 120, by default the Members submode is selected.

Figure 8:
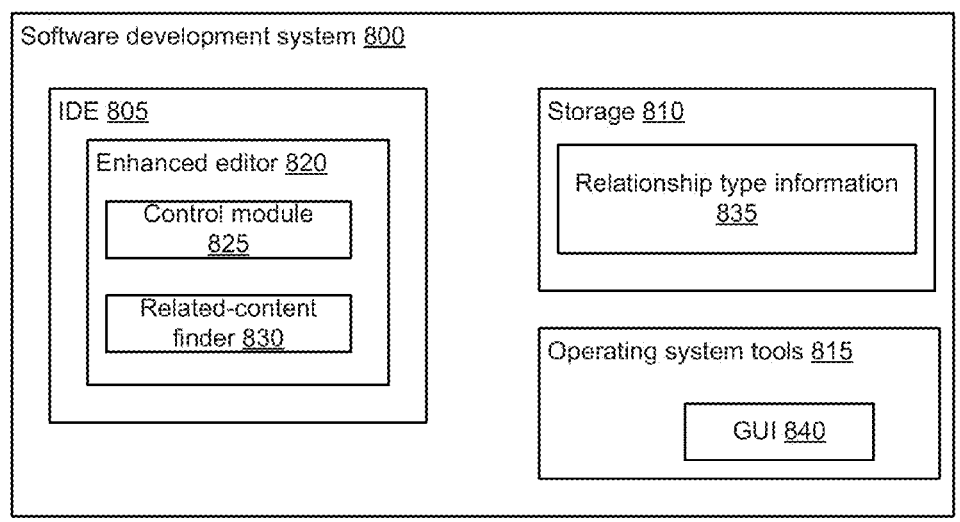
FIG. 8 is a block diagram of a software development system with an enhanced editor for automatically displaying a related file, according to one embodiment of the invention.

FIG. 8 is a block diagram of a software development system with an enhanced editor for automatically displaying a related file, according to one embodiment of the invention. The software development system 800 is able to automatically display a related file. The illustrated software development system 800 includes an integrated development environment (IDE) 805, storage 810, and operating system tools 815.

In one embodiment, the IDE 805 (and its component modules and the operating system tools 815 are one or more computer program modules stored on one or more computer readable storage mediums and executing on one or more processors. The storage 810 (and its contents) is stored on one or more computer readable storage mediums. Additionally, the IDE 805 (and its component modules), the operating system tools 815, and the storage 810 (and its contents) are communicatively coupled to one another to at least the extent that data can be passed between them. In one embodiment, the operating system tools 815 are executing as one or more parts of an operating system on a personal computer and the IDE 805 is executing on the same personal computer.

The storage 810 stores relationship type information 835. Relationship type information 835 includes, for example, a mapping, from a file type to a list of possible relationship types (similar to Table 1). Relationship type information 835 also includes, for example, an indication of which relationship type (from the list of relationship types) is the default type when automatically determining a submode for the related editor. Relationship type information 835 also includes, for example, an ordering strategy for multiple items when automatically determining a related file to show in the related editor.

The operating system tools 815 include a graphical user interface (GUI) 840. The GUI 840 outputs information to a user (e.g., using a display device) and receives information from a user (e.g., using a pointing device and/or keyboard).

The IDE 805 includes multiple modules. Some of the modules (not shown) use conventional IDE technologies, such as a compiler/interpreter, build automation tools, and a debugger. The compiler/interpreter compiles/interprets source code. The build automation tools build an executable application (using the compiler/interpreter) based on various files such as source code and libraries. The debugger enables a developer to debug source code. The ME 805 also includes an enhanced editor 820. Modules can be built in to the IDE or can be loaded in to the IDE separately (e.g., from a software development kit or "SDK").

The enhanced editor 820 is able to automatically display a related file. The enhanced editor 820 includes a control module 825 and a related-content finder 830.

The control module 825 automatically displays a related file. Its operation is discussed below with reference to FIG. 9.

The related-content finder 830 finds related content given a file and a text selection or insertion point location within that file (if any). For example, the related-content finder 830 finds related content (to show in the related editor) given a file (primary file) and a text selection or insertion point location within that file (if any). Exactly how the related-content finder 830 finds related content depends on the file type of the given file and was explained above with reference to the various submodes (relationship types).

Figure 9:
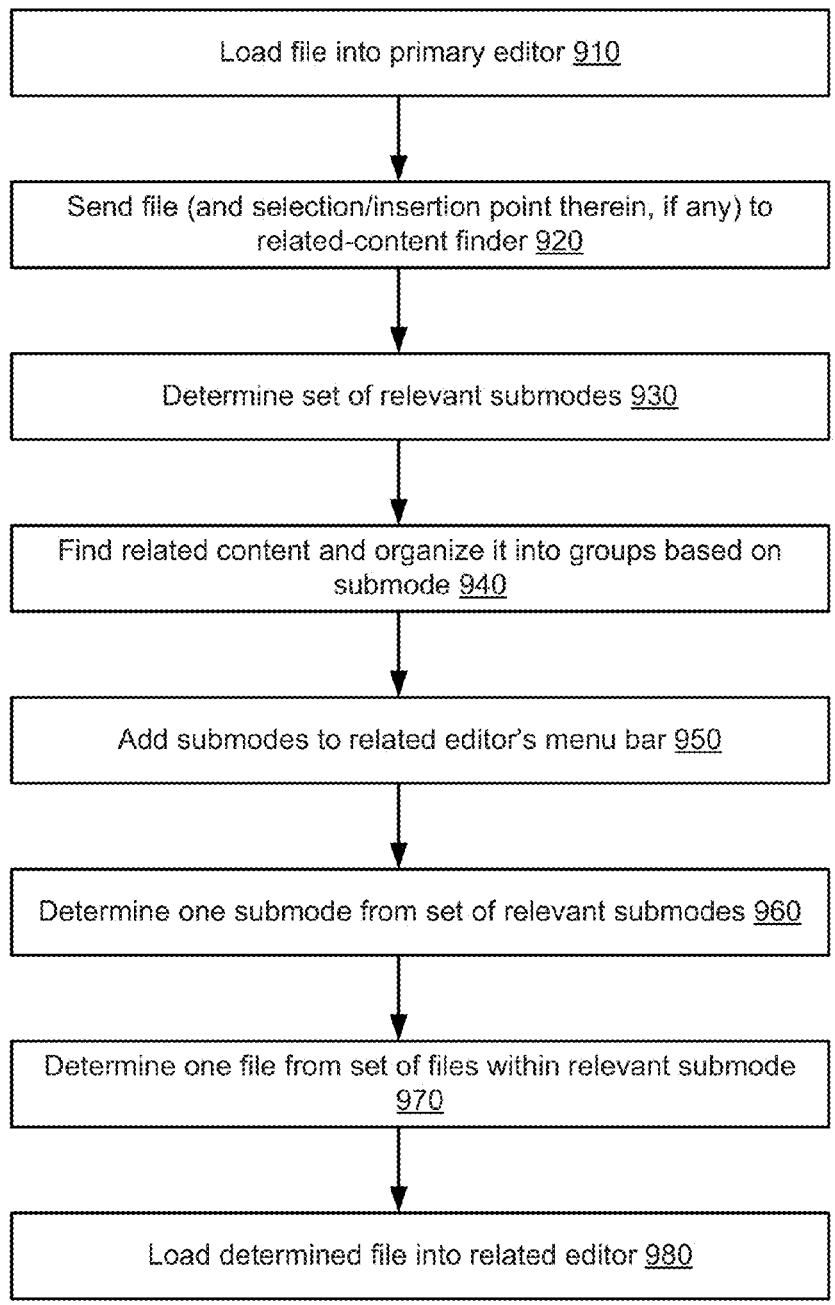
FIG. 9 is a flowchart of a method for automatically displaying a related file, according to one embodiment of the invention.

FIG. 9 is a flowchart of a method for automatically displaying a related file, according to one embodiment of the invention. In one embodiment, steps 910 to 980 are performed by various modules within the enhanced editor 820. In step 910, a file is loaded into the primary editor. For example, the control module 825 loads the "primary file" into content pane 120. The content of the primary file is displayed using the GUI 840.

In step 920, the file (and a text selection or insertion point location within the file, if any) is sent to the related-content finder 830. For example, the control module 825 sends the primary file (and a selection/insertion point, if any) to the related-content finder 830.

In step 930, a set of relevant submodes is determined. These submodes represent the relationship types that are available for the primary file based on the file type of the primary file. For example, the related-content finder 830 determines a set of submodes (relationship types) that are relevant to the primary file based on the relationship type information 835 (e.g., Table 1).

In step 940, related content is found and organized into groups based on submode. For example, the related-content finder 830 finds content that is related to the primary file based on the submodes that were determined in step 930. The related content is organized into groups based on submode.

In step 950, the relevant submodes are added to the related editor's menu bar. For example, the control module 825 adds the submodes that were determined in step 930 to the related editor's menu bar 210 (specifically, to the first segment of the path control 430). These submodes are now available for a user to select in order to change the file that is shown in the related editor (if desired). The menu bar 210 can be displayed using the GUI 840.

In step 960, one submode is determined from the set of relevant submodes. For example, the control module 825 determines one submode (a default, submode or a most-recently-used submode) from the submodes that were determined in step 930, based on the default submode information in the relationship type information 835 or based on a stored indication of the most-recently-used submode. The determined submode is used for the related editor.

In step 970, one file is determined from the set of files within the determined submode. For example, the control module 825 accesses the related content that was found in step 940 for the submode that was determined in step 960. One file from this related content is determined, based on the ordering information in the relationship type information 835.

In step 980, the determined file is loaded into the related editor. For example, the control module 825 loads the file that was determined in step 970 into the related editor. The file that is loaded is the "related file", which is automatically displayed based on the primary file. The related file is displayed using the GUI 840.

Figure 10:
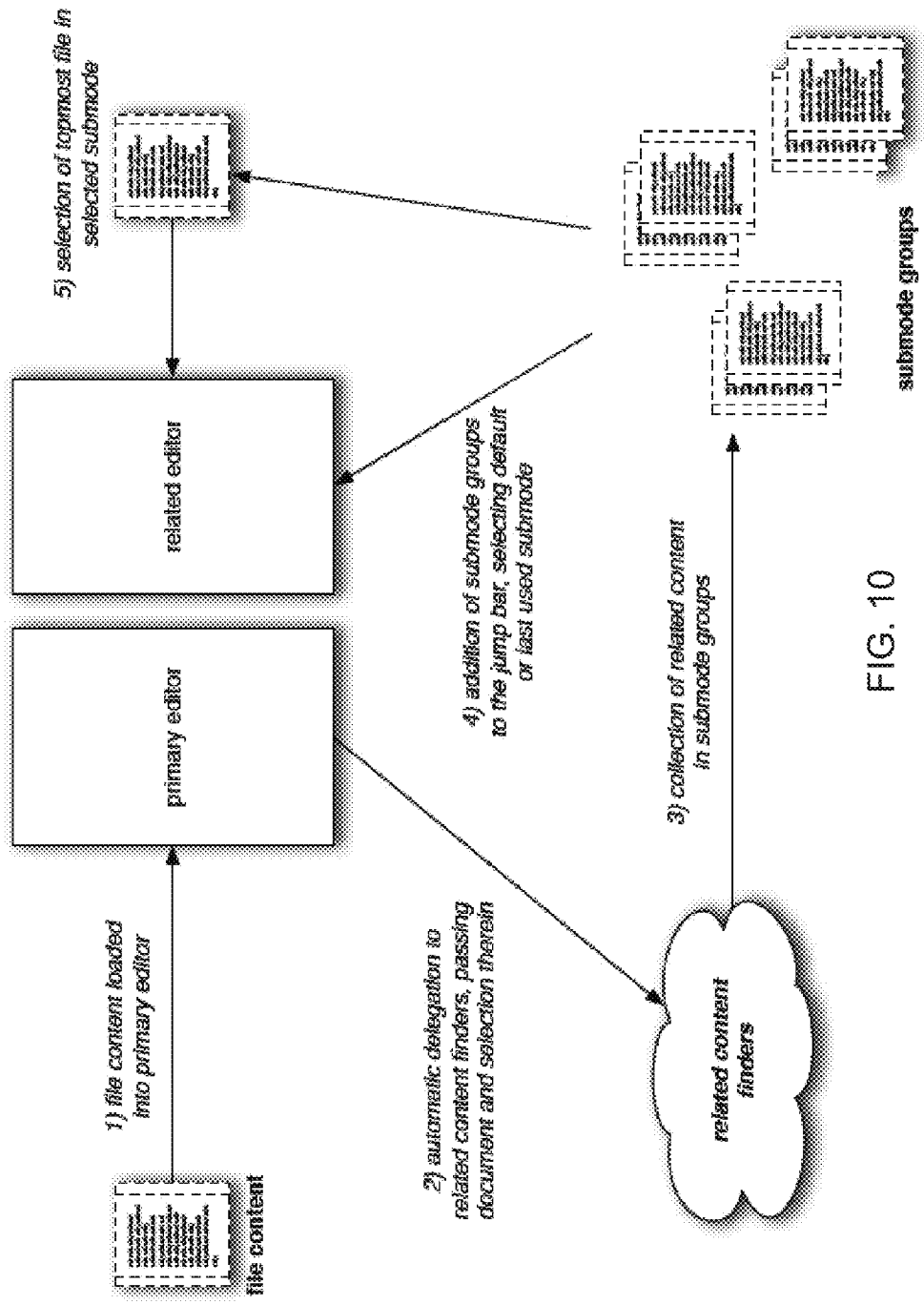
FIG. 10 is a conceptual overview of automatically displaying a related file, according to one embodiment of the invention.

FIG. 10 is a conceptual overview of automatically displaying a related file, according to one embodiment of the invention. In step 1, file content is loaded into a primary editor. In step 2, automatic delegation to a related-content finder is performed, and a document and a selection therein are passed. In step 3, related content is collected in submode groups. In step 4, the submode groups are added to the related editor's jump bar, and a default or last-used submode is selected. In step 5, the top-most file in the selected submode is selected.

Reference in the specification to "one embodiment" or to "an embodiment" means that a particular feature, structure, or characteristic described in connection with the embodiments is included in at least one embodiment of the invention. The appearances of the phrase "in one embodiment" or "a preferred embodiment" in various places in the specification are not necessarily all referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the preceding discussion, it is appreciated that throughout the description, discussions utilizing terms such as "processing" or "computing" or "calculating" or "determining" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of a method. It should be noted that the process steps and instructions of the present invention can be embodied in software, firmware or hardware, and when embodied in software, can be downloaded to reside on and be operated from different platforms used by a variety of operating systems.

The present invention also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the above description. In addition, the present invention is not described with reference to any particular programming language. It will be appreciated that a variety of programming languages may be used to implement the teachings of the present invention as described herein, and any references above to specific languages are provided for disclosure of enablement and best mode of the present invention.

While the invention has been particularly shown and described with reference to a preferred embodiment and several alternate embodiments, it will be understood by persons skilled in the relevant art that various changes in form and details can be made therein without departing from the spirit and scope of the invention.

Finally, it should be noted that the language used in the specification has been principally selected for readability and instructional purposes, and may not have been selected to delineate or circumscribe the inventive subject matter accordingly, the disclosure of the present invention is intended to be illustrative, but not limiting, of the scope of the invention.

What is claimed is:

1. A method for automatically displaying related content within an integrated development environment (IDE), the method comprising:
   at a computing device:
   receiving a selection of a primary file;
   displaying a primary window in a graphical user interface (GUI), wherein the primary window displays content of the primary file;
   determining, based on a file type of the primary file, one or more relationship types that are associated with the file type, wherein a particular one of the one or more relationship types is a default relationship type with respect to the file type of the primary file;

based on the default relationship type, determining one or more files that are related to the primary file;

based on a predetermined criteria, selecting a most relevant file of the one or more files; and displaying a secondary window in the GUI, wherein the secondary window displays content of the most relevant file, and the secondary window further includes:

a first GUI element that displays the default relationship type associated with the primary file and allows selection of at least one relationship type from the one or more relationship types that is different than the default relationship type, a second GUI element that displays an attribute associated with the most relevant file and allows selection of at least one file from the one or more files that is different than the most relevant file, and a third GUI element that allows selection of one or more navigation points within the most relevant file.

2. The method of claim 1, wherein the file type of the primary file is selected from a group consisting of: "source code," "data model," "data mapping model," "interface," "project," "strings," "resource," and "activity log."

3. The method of claim 1, wherein the file type of the primary file is "source code," and determining the one or more files is based on symbolic information associated with the primary file.

4. The method of claim 1, wherein the file type of the primary file is "data model," and determining the one or more files involves introspecting a selected entity in the primary file.

5. The method of claim 1, wherein the file type of the primary file is "interface," and determining the one or more files involves determining a top-level object in the primary file that is most-used.

6. The method of claim 1, wherein the file type of the primary file is "project," and determining the one or more files involves searching for a project reference within the primary file.

7. The method of claim 1, wherein the most relevant file is of a different type than the primary file.

8. A non-transitory computer-readable medium including instructions that, when executed by a processor, cause the processor to implement a method for automatically displaying related content within an integrated development environment (IDE), the method comprising:

receiving a selection of a primary file;

displaying a primary window in a graphical user interface (GUI), wherein the primary window displays content of the primary file;

determining, based on a file type of the primary file, one or more relationship types that are associated with the file type, wherein a particular one of the one or more relationship types is a default relationship type with respect to the file type of the primary file;

based on the default relationship type, determining one or more files that are related to the primary file;

based on a predetermined criteria, selecting a most relevant file of the one or more files; and displaying a secondary window in the GUI, wherein the secondary window displays content of the most relevant file, and the secondary window further includes:

a first GUI element that displays the default relationship type associated with the primary file and allows selection of at least one relationship type from the one or more relationship types that is different than the default relationship type, a second GUI element that displays an attribute associated with the most relevant file and allows selection of at least one file from the one or more files that is different than the most relevant file, and a third GUI element that allows selection of one or more navigation points within the most relevant file.

9. The non-transitory computer-readable medium of claim 8, wherein the file type of the primary file is selected from a group consisting of: "source code," "data model," "data mapping model," "interface," "project," "strings," "resource," and "activity log."

10. The non-transitory computer-readable medium of claim 8, wherein the file type of the primary file is "source code," and determining the one or more files is based on symbolic information associated with the primary file.

11. The non-transitory computer-readable medium of claim 8, wherein the file type of the primary file is "data model," and determining the one or more files involves introspecting a selected entity in the primary file.

12. The non-transitory computer-readable medium of claim 8, wherein the file type of the primary file is "interface," and determining the one or more files involves determining a top-level object in the primary file that is most-used.

13. The non-transitory computer-readable medium of claim 8, wherein the file type of the primary file is "project," and determining the one or more files involves searching for a project reference within the primary file.

14. A system, comprising:

a processor; and a memory storing instructions that, when executed, cause the processor to implement a method for automatically displaying related content within an integrated development environment (IDE), the method comprising:

receiving a selection of a primary file;

displaying a primary window in a graphical user interface (GUI), wherein the primary window displays content of the primary file;

determining, based on a file type of the primary file, one or more relationship types that are associated with the file type, wherein a particular one of the one or more relationship types is a default relationship type with respect to the file type of the primary file;

based on the default relationship type, determining one or more files that are related to the primary file;

based on a predetermined criteria, selecting a most relevant file of the one or more files; and displaying a secondary window in the GUI, wherein the secondary window displays content of the most relevant file, and the secondary window further includes:

a first GUI element that displays the default relationship type associated with the primary file and allows selection of at least one relationship type from the one or more relationship types that is different than the default relationship type, a second GUI element that displays an attribute associated with the most relevant file and allows selection of at least one file from the one or more files that is different than the most relevant file, and a third GUI element that allows selection of one or more navigation points within the most relevant file.

15. The system of claim 14, wherein the file type of the primary file is selected from a group consisting of: "source code," "data model," "data mapping model," "interface," "project," "strings," "resource," and "activity log."

16. The system of claim 14, wherein the file type of the primary file is "source code," and determining the one or more files is based on symbolic information associated with the primary file.

17. The system of claim 14, wherein the file type of the primary file is "data model," and determining the one or more files involves introspecting a selected entity in the primary file.

18. The system of claim 14, wherein the file type of the primary file is "interface," and determining the one or more files involves determining a top-level object in the primary file that is most-used.

19. The system of claim 14, wherein the file type of the primary file is "project," and determining the one or more files involves searching for a project reference within the primary file.

\* \* \* \* \*